W. L. CLOUSE.
FLY WHEEL.
APPLICATION FILED OCT. 19, 1910.
1,015,476.
Patented Jan. 23, 1912.
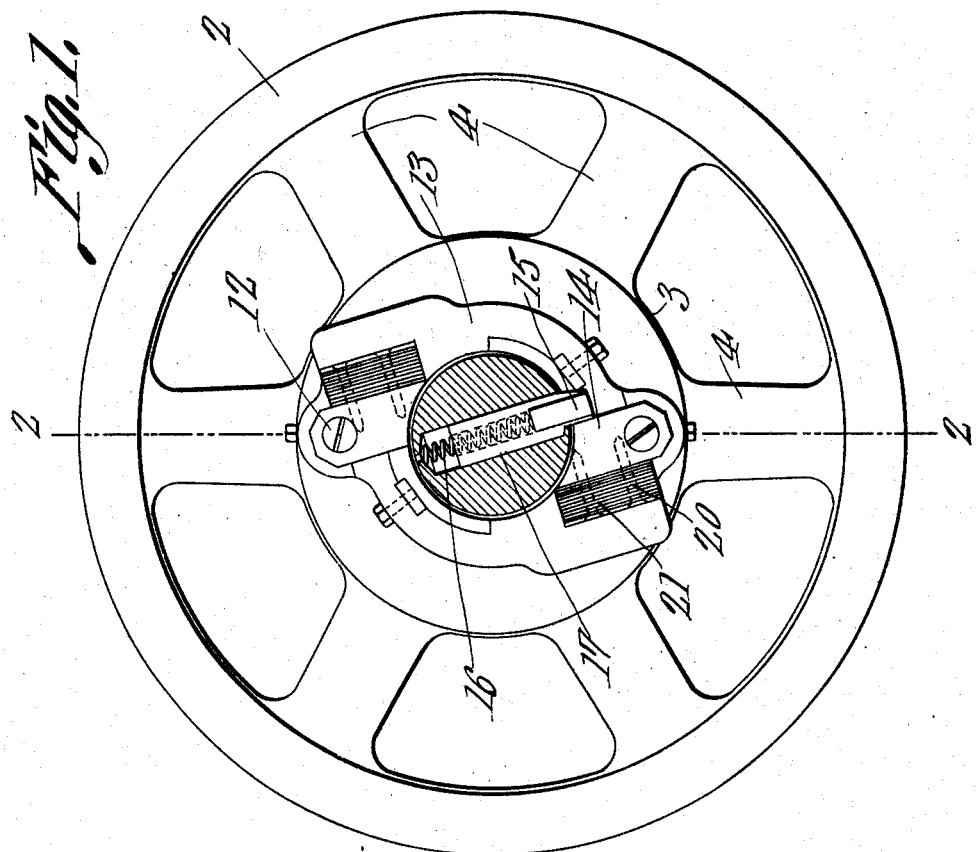
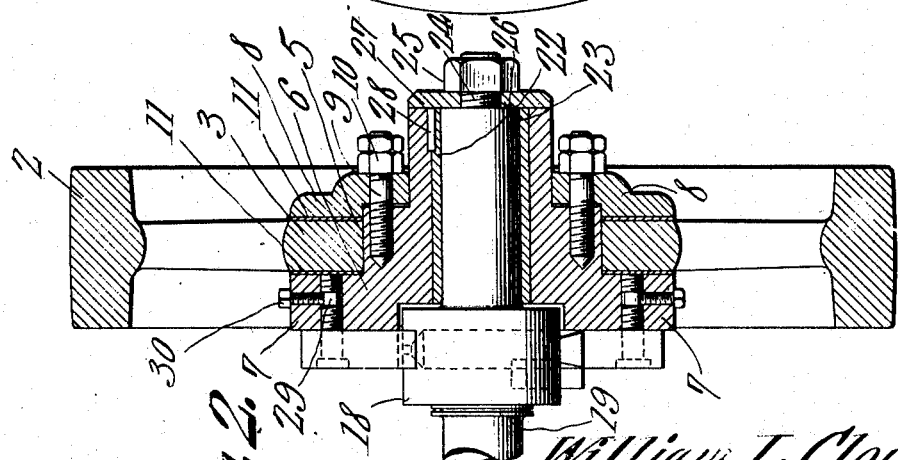
Witnesses
William L. Clouse
Inventor
by C. A. Snow & Co.
Attorneys

UNITED STATES PATENT OFFICE.

WILLIAM L. CLOUSE, OF TIFFIN, OHIO, ASSIGNOR TO NATIONAL MACHINERY COMPANY, OF TIFFIN, OHIO.

FLY-WHEEL.

1,015,476. Specification of Letters Patent. Patented Jan. 23, 1912.

Application filed October 19, 1910. Serial No. 587,935.

*To all whom it may concern:*

Be it known that I, WILLIAM L. CLOUSE, a citizen of the United States, residing at Tiffin, in the county of Seneca and State of Ohio, have invented a new and useful Fly-Wheel, of which the following is a specification.

This invention belongs to the art of machinery, especially machine elements, and it more particularly relates to a new and useful slip fly wheel, in which there exist novel features of construction.

The invention in its broadest aspect aims to provide a slip fly wheel, the hub of which encircles a revoluble clutch member, between two friction surfaces, which maintain a constant friction between the surfaces and the hub.

It has been found in practice that fly wheels are accidentally stalled during a part of their revolution, the result of which is that because of their necessary weight great strains are thrown upon the machinery.

The object of the invention is to overcome this difficulty, by providing this new type of slip fly wheel. By this construction of fly wheel, viz., the clamping of the fly wheel hub between the friction surfaces so that if any unusual strain in the machine tends to stall the fly wheel and bring the main shaft and clutchable member immediately to rest, the fly wheel has a chance to slip between the friction surfaces. Moreover, it will be noted that this method of mounting a fly wheel assists in reducing repairs.

In the drawings, however, there is only disclosed one particular form of the invention, but in practical fields this form may require certain alterations, to which the applicant is entitled, provided the alterations are comprehended by the appended claim.

Other features and combination of parts will be hereinafter more fully set forth, shown in the drawings, and claimed.

In the drawings:—Figure 1 is a side elevation of a fly wheel, in which is embodied the various features of the invention. Fig. 2 is a sectional view on a line 2—2 of Fig. 1.

In the drawings is shown a fly wheel which comprises the rim 2, the flat hub 3 and the spokes 4. The hub 3 is received upon a shoulder or intermediate portion 5 of the sleeve 6 having three stepped portions. The larger stepped portion of the sleeve 6 forms a flange 7 between which and the ring 8, the hub 3 is frictionally clamped, with just sufficient force to permit the same to slip slightly in case the fly wheel stalls. This ring 8 has an inner recess into which the shoulder or intermediate portion 5 of the sleeve 6 is adapted to pass thus permitting the outer portion of the said ring to pass over the said shoulder. This ring 8 is fastened securely to the sleeve by the stud bolts 9, upon which are mounted lock nuts 10, thereby preventing accidental displacement of the stud bolts. Also arranged betwen the ring and the hub, and between the flange and the hub, are fiber washers or rings 11, which serve only to maintain a constant coefficient of friction between the hub, the flange, and the washers or rings.

In connection with this slip fly wheel there is provided a clutching mechanism, whereby the hub of the fly wheel may be clutched or not. The details of this clutching mechanism form no part of the present invention. However, it comprises the following elements, to wit: Integral with the annular shaft 19 is the annular enlargement 18 which serves as an abutment for the hardened steel blocks 14. Mounted upon the screw bolts 12 in the flange 7 are case hardened steel blocks 14, one of which is designed to be contacted with by the clutch pin 15. This clutch pin is mounted in a recess 17 of the enlargement 18 of the shaft 19 and pressed normally out of said recess by a spring 16 therein acting transversely of the shaft. Arranged between the blocks 14 and a portion of the arms, are laminated steel plates 20, which serve as cushions to the case hardened steel blocks, when one of the blocks is contacted with by the clutch pin. These steel plates 20 are secured in position against the blocks by means of the pins 21, shown in dotted lines in Fig. 1.

From the foregoing, it will be observed that a novel construction of slip fly wheel is produced, which will obviate the intense strains which are a feature of former devices. Moreover, the main feature of the invention is the fact that the fly wheel proper is mounted to move with the revoluble clutch member, but capable of slipping between friction surfaces which are arranged on each side of the fly wheel hub.

Referring to Fig. 2, it will be noted that the sleeve 6 is provided with a bushing 22 which is splined or keyed to the sleeve in order to rotate therewith. The end 23 of the shaft 19 is provided with a reduced threaded portion 24 for the reception of a nut 25. Between this nut and the shoulder 26, formed by reducing the end of the shaft, is a washer 27. By the provision of this washer, the fly wheel is prevented from displacement. The screw bolts 12, which hold the arms in their proper positions, are provided with annular grooves 29 into which the extremities of the lock screws 30 extend. These lock screws 30 extend through the flange 7 radially with regard to the center of the fly wheel, and the purpose of this is to prevent displacement of the screw bolts 12. Upon an examination of the drawings this feature will be apparent, as well as others heretofore set forth.

The invention having been set forth, what is claimed as new and useful is:

The combination with a shaft having an enlargement thereon and a washer secured on the end of the shaft, of a sleeve fitting between the said enlargement and washer and comprising three stepped portions, a fly wheel having a flat hub arranged on the intermediate portion of the sleeve, a ring fitting on the smallest portion of the sleeve and having an inner recess receiving one end of the intermediate portion of the sleeve, bolts for drawing the ring toward the sleeve, and means for engaging the said sleeve to the said enlargement of the shaft.

In testimony that I claim the foregoing as my own, I have hereto affixed my signature in the presence of two witnesses.

WILLIAM L. CLOUSE.

Witnesses:
   EARL C. KNAPP,
   W. N. CLOUSE.